(12) United States Patent
Barksdale et al.

(10) Patent No.: US 6,422,134 B1
(45) Date of Patent: Jul. 23, 2002

(54) GRILL APPARATUS

(76) Inventors: Elmor Barksdale; Kesha Green, both of 918 S. 19th St., Newark, NJ (US) 07108

( * ) Notice: Subject to any disclaimer, the term of this patent is extended or adjusted under 35 U.S.C. 154(b) by 0 days.

(21) Appl. No.: 09/939,041

(22) Filed: Aug. 24, 2001

(51) Int. Cl.[7] .......................... A47J 37/00; A47J 37/04; A47J 37/07
(52) U.S. Cl. .......................... 99/340; 99/355; 99/446; 99/450; 99/482; 126/9 R; 126/25 R
(58) Field of Search .................. 99/339, 340, 352–355, 99/400, 401, 444, 445–450, 481, 482; 126/25 R, 9 R, 275 R; 426/465, 423, 314, 315

(56) References Cited

U.S. PATENT DOCUMENTS

| | | | |
|---|---|---|---|
| 4,108,055 A | 8/1978 | Simmons | |
| 4,170,173 A | 10/1979 | Bradford | |
| 4,664,026 A | * 5/1987 | Milloy | ........................ 99/352 |
| 4,665,891 A | * 5/1987 | Nemec et al. | ............. 99/447 X |
| 4,757,756 A | 7/1988 | Van Marr | |
| 5,140,896 A | * 8/1992 | Duran | ...................... 99/450 X |
| 5,325,841 A | 7/1994 | Hooper, Sr. | |
| 5,373,778 A | 12/1994 | Moreth | |
| 5,673,613 A | * 10/1997 | Price | ........................... 99/482 |
| D409,435 S | 5/1999 | Husted | |
| 5,947,013 A | * 9/1999 | Stewart, Jr. | ................... 99/446 |
| 6,012,381 A | * 1/2000 | Hawn | ........................... 99/340 |
| 6,209,533 B1 | * 4/2001 | Ganard | ..................... 126/25 R |

* cited by examiner

Primary Examiner—Timothy F. Simone

(57) ABSTRACT

A grill apparatus for grilling large quantities of food. The grill apparatus includes a drum support assembly including a plurality of leg members, and also including cross members interconnecting said leg members; and also including a drum member having a side wall which is securely mounted upon top ends of the leg members and also having end walls and further having an opening disposed through the side wall and into the drum member and also having a hole being disposed through one of the end walls; and also includes a lid being hingedly attached to the drum member and being closable over the opening; and further includes a door being hingedly attached to the drum member and being closable over the hole; and also includes a grate assembly including a grate member being removably disposed in the drum member; and further includes tray members being attached to the drum member.

13 Claims, 3 Drawing Sheets

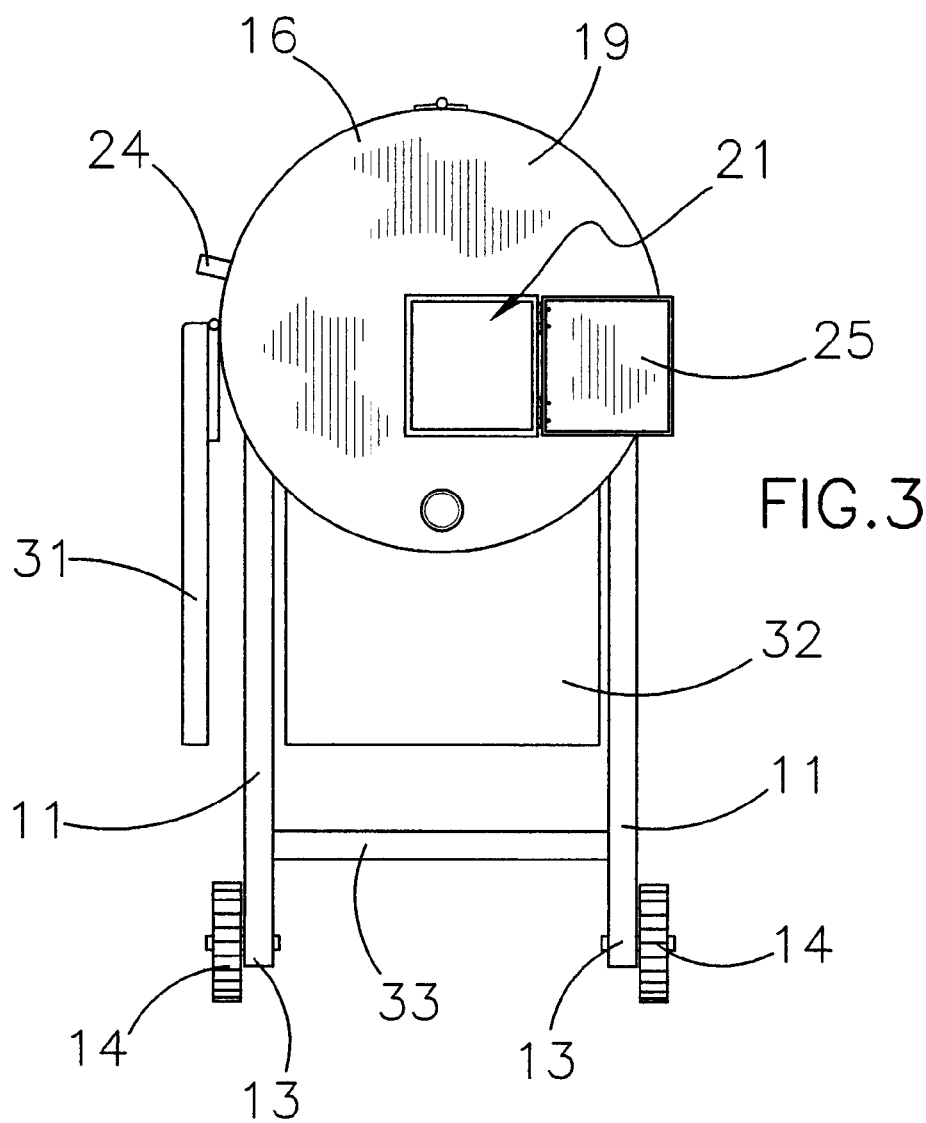
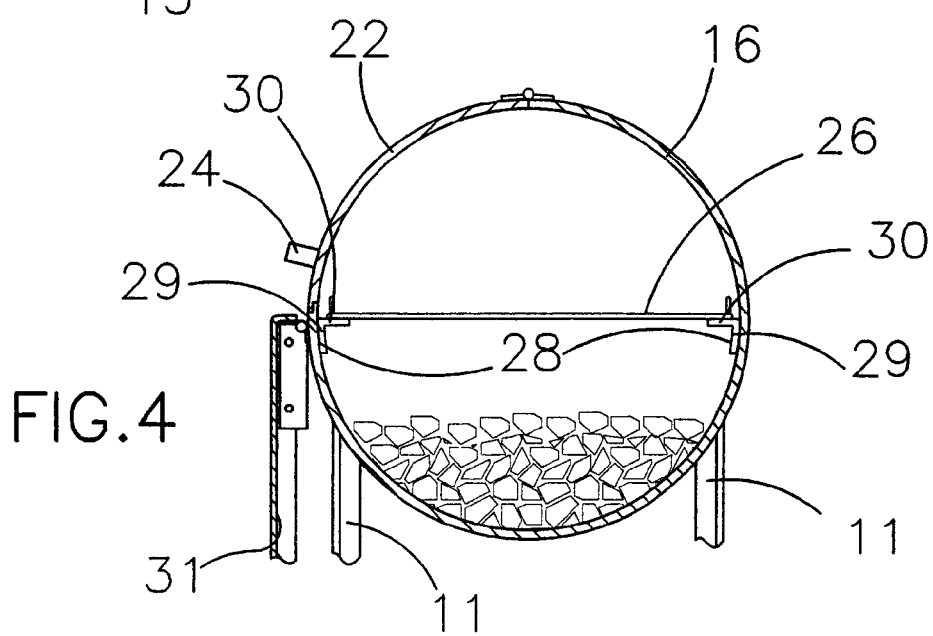

GRILL APPARATUS

BACKGROUND OF THE INVENTION

1. Field of the Invention

The present invention relates to barbeque grills and more particularly pertains to a new grill apparatus for grilling large quantities of food.

2. Description of the Prior Art

The use of barbeque grills is known in the prior art. More specifically, barbeque grills heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,108,055; U.S. Pat. No. 4,170,173; U.S. Pat. No. 5,373,778; U.S. Pat. No. 5,325,841; U.S. Pat. No. 4,757,756, and U.S. Pat. No. Des. 409,435.

While these devices fulfill their respective, particular objectives and requirements, the aforementioned patents do not disclose a new grill apparatus. The inventive device includes a drum support assembly including a plurality of leg members, and also including cross members interconnecting said leg members; and also including a drum member having a side wall which is securely mounted upon top ends of the leg members and also having end walls and further having an opening disposed through the side wall and into the drum member and also having a hole being disposed through one of the end walls; and also includes a lid being hingedly attached to the drum member and being closable over the opening; and further includes a door being hingedly attached to the drum member and being closable over the hole, and also includes a grate assembly including a grate member being removably disposed in the drum member; and further includes tray members being attached to the drum member.

In these respects, the grill apparatus according to the present invention substantially departs from the conventional concepts and designs of the prior art, and in so doing provides an apparatus primarily developed for the purpose of grilling large quantities of food.

SUMMARY OF THE INVENTION

In view of the foregoing disadvantages inherent in the known types of barbeque grills now present in the prior art, the present invention provides a new grill apparatus construction wherein the same can be utilized for grilling large quantities of food.

The general purpose of the present invention, which will be described subsequently in greater detail, is to provide a new grill apparatus which has many of the advantages of the barbeque grills mentioned heretofore and many novel features that result in a new grill apparatus which is not anticipated, rendered obvious, suggested, or even implied by any of the prior art barbeque grills, either alone or in any combination thereof.

To attain this, the present invention generally comprises a drum support assembly including a plurality of leg members, and also including cross members interconnecting said leg members; and also including a drum member having a side wall which is securely mounted upon top ends of the leg members and also having end walls and further having an opening disposed through the side wall and into the drum member and also having a hole being disposed through one of the end walls; and also includes a lid being hingedly attached to the drum member and being closable over the opening; and further includes a door being hingedly attached to the drum member and being closable over the hole; and also includes a grate assembly including a grate member being removably disposed in the drum member; and further includes tray members being attached to the drum member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new wheeled grill apparatus which has many of the advantages of the barbeque grills mentioned heretofore and many novel features that result in a new grill apparatus which is not anticipated, rendered obvious, suggested, or even implied by any of the prior art barbeque grills, either alone or in any combination thereof.

It is another object of the present invention to provide a new grill apparatus which may be easily and efficiently manufactured and marketed.

It is a further object of the present invention to provide a new grill apparatus which is of a durable and reliable construction.

An even further object of the present invention is to provide a new grill apparatus which is susceptible of a low cost of manufacture with regard to both materials and labor, and which accordingly is then susceptible of low prices of sale to the consuming public, thereby making such grill apparatus economically available to the buying public.

Still vet another object of the present invention is to provide a new grill apparatus which provides in the apparatuses and methods of the prior art some of the advantages thereof, while simultaneously overcoming some of the disadvantages normally associated therewith.

Still another object of the present invention is to provide a new grill apparatus for grilling large quantities of food.

Yet another object of the present invention is to provide a new grill apparatus which includes a drum support assembly including a plurality of leg members, and also including cross members interconnecting said leg members; and also including a drum member having a side wall which is securely mounted upon top ends of the leg members and also having end walls and further having an opening disposed through the side wall and into the drum member and also having a hole being disposed through one of the end walls; and also includes a lid being hingedly attached to the drum member and being closable over the opening; and further includes a door being hingedly attached to the drum member and being closable over the hole; and also includes a grate assembly including a grate member being removably disposed in the drum member; and further includes tray members being attached to the drum member.

Still yet another object of the present invention is to provide a new grill apparatus that is easy and convenient to use.

Even still another object of the present invention is to provide a new grill apparatus that effectively and efficiently reduces the amount of time needed to prepare foods outdoors.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an end elevational view of the present invention.

FIG. 4 is a cross-sectional view of the drum member of the present invention.

DESCRIPTION OF THE PREFERRED EMBODIMENT

Figure 1:
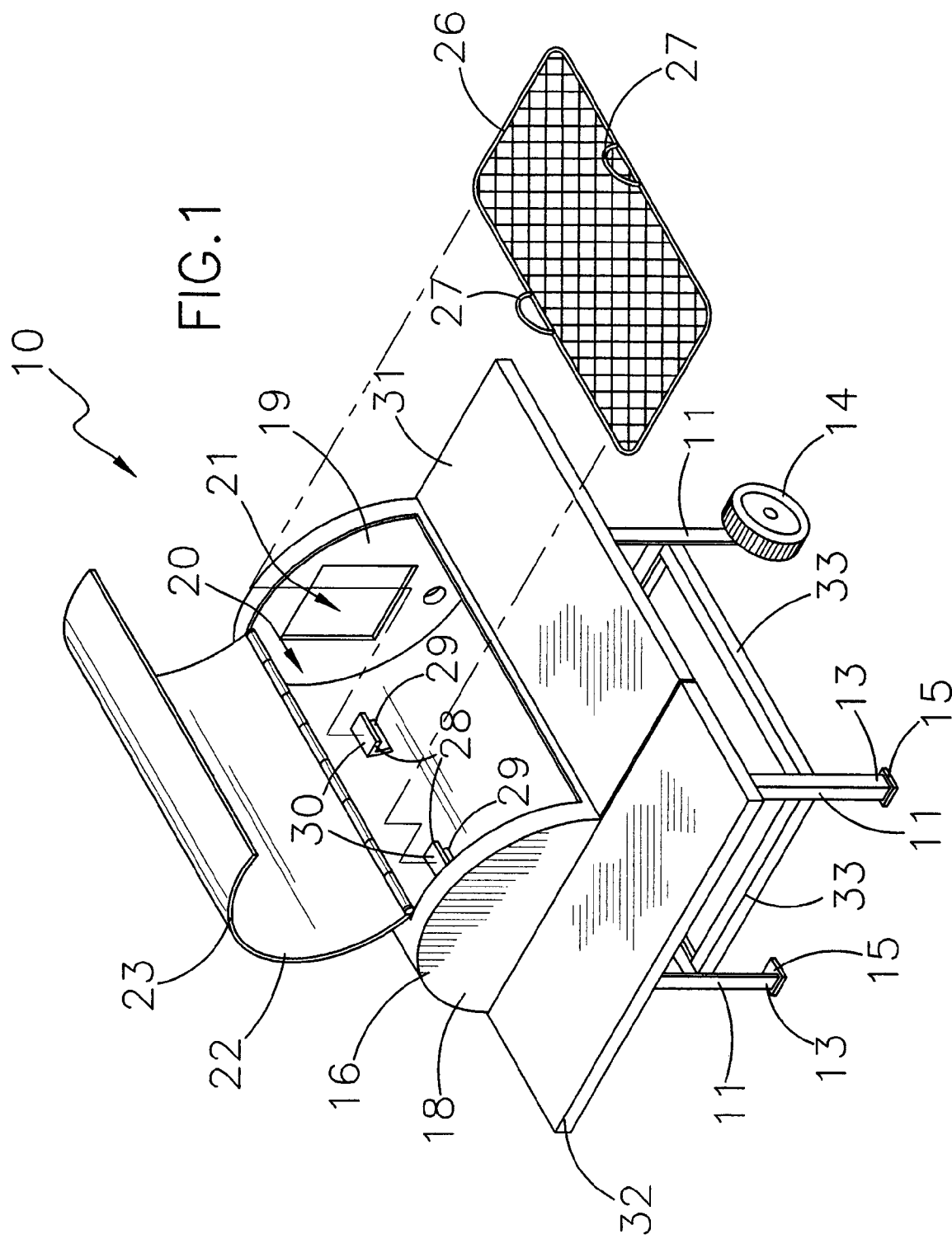
FIG. 1 is a perspective view of a new grill apparatus according to the present invention.
Figure 2:
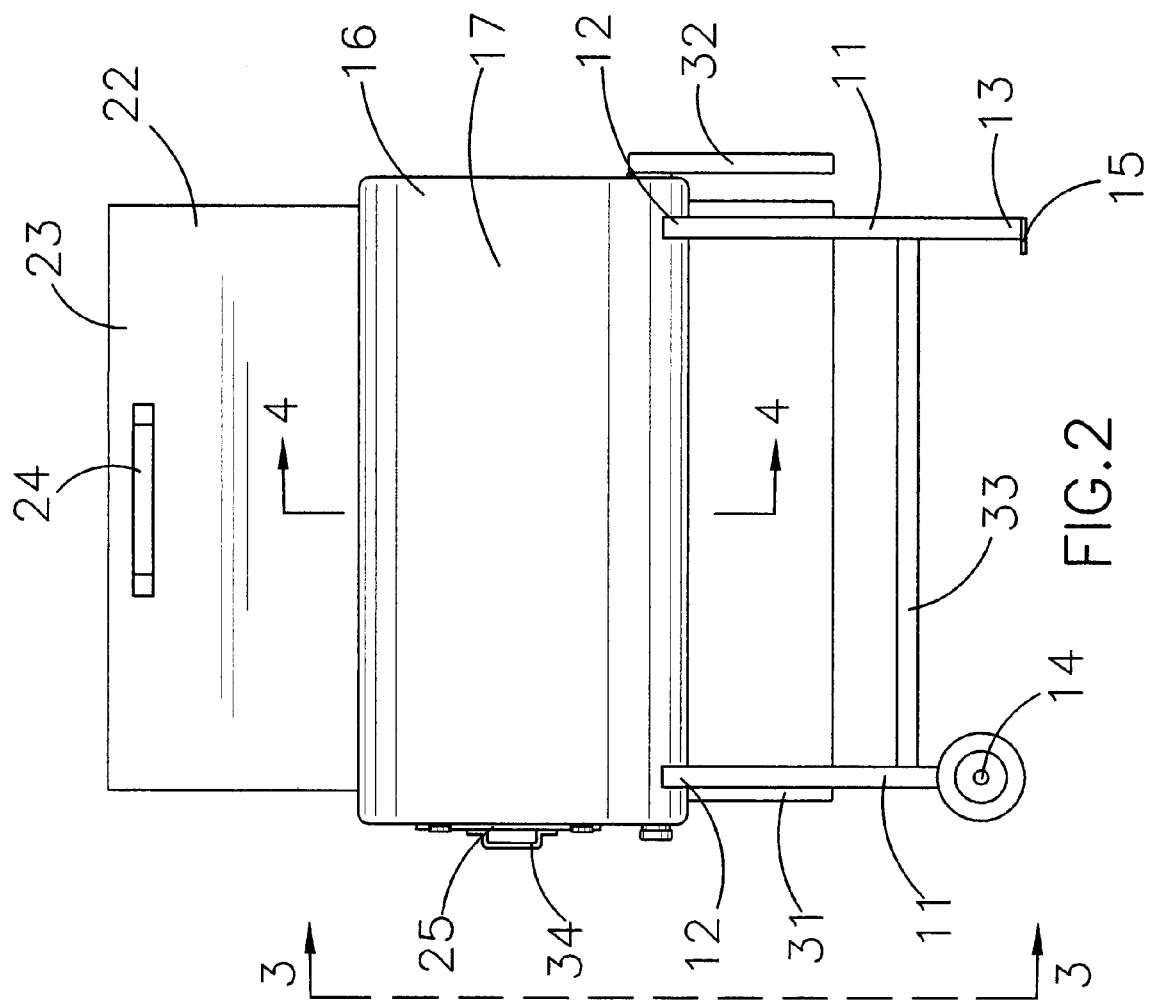
FIG. 2 is a side elevational view of the present invention.

With reference now to the drawings, and in particular to FIGS. 1 through 4 thereof, a new grill apparatus embodying the principles and concepts of the present invention and generally designated by the reference numeral 10 will be described.

As best illustrated in FIGS. 1 through 4, the grill apparatus 10 generally comprises a drum support assembly including a plurality of leg members 11, and also including cross members 33 conventionally interconnecting the leg members 11. The drum support assembly also includes wheel members 14 being conventionally attached at bottom ends 13 of at least two of the leg members 11, and further includes feet members 15 being conventionally attached at bottom ends 13 of the others of the leg members 11.

A drum member 16 has a side wall 17 which is securely and conventionally mounted upon top ends 12 of the leg members 11 and further has end walls 18,19 and also has an opening 20 being disposed through the side wall 17 and into the drum member 16 and further has a hole 21 being disposed through one of the end walls 19. The drum member 16 is cylindrically-shaped with the drum member 16 having a length of approximately 52 inches and a width of approximately 48 inches.

A lid 22 is hingedly attached to the drum member 16 and is closable over the opening 20. The lid 22 includes a laterally-curved wall 23, and also includes a handle 24 being attached to the laterally-curved wall 23. A door 25 is hingedly attached to the drum member 16 and is closable over the hole 21 and also has a handle member 34.

A grate assembly includes a grate member 26 being removably disposed in the drum member 16. The grate assembly further includes bracket members 28 being conventionally attached in the drum member 16 to the side wall 17, and also includes handle members 27 being attached along edges of the grate member 26. Each of the bracket members 28 has a first planar portion 29 which is conventionally attached to the drum member 17 and also has a second planar portion 30 which is angled relative to the first planar portion 29 and which supports the grate member 26 thereupon.

Tray members 31,32 are conventionally attached to the drum member 16. The tray members 31,32 include a first tray member 31 which is hingedly attached to an exterior of the side wall 17 of the drum member 16 below the opening 20 and which extends a length of the drum member 16, and also includes a second tray member 32 which is hingedly attached to one of the end walls 18 of the drum member 16 and which extends outwardly of the side wall 17 of the drum member 16 with the first tray member 31 having a length of approximately 48¾ inches and a width of approximately 12½ inches.

In use, the user places the grate member 26 upon the bracket members 28 in the drum member 16, and places large quantities of food on the grate member 26 with charcoal being placed in the drum member 16 and being set afire to cook the food.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A grill apparatus comprising:
   a drum support assembly including a plurality of leg members;
   a drum member mounted on said drum support assembly, said drum member having a side wall and end walls, said drum member having an opening disposed through said side wall and into said drum member;

a lid being hingedly attached to said drum member and being closable over said opening;

a grate assembly including a grate member being removably disposed in said drum member, and tray members being attached to said drum member, a front one of said tray members being mounted adjacent to said side wall of said drum member a side one of said tray members being mounted adjacent to said side wall of said drum member, each of said front and said side tray members being pivotable between a raised position in which said tray member is oriented substantially perpendicular to said leg members and a lowered position in which said tray member is oriented substantially parallel to said leg members.

2. A grill apparatus as described in claim 1, wherein said drum support assembly also includes wheel members being attached at bottom ends of at least two of said leg members, and further includes feet members being attached at bottom ends of the other of said leg members.

3. A grill apparatus as described in claim 1, wherein said drum member is cylindrically-shaped.

4. A grill apparatus comprising:

a drum support assembly including a plurality of leg members, and also including cross members interconnecting said leg members;

a drum member having a side wall which is securely mounted upon top ends of said leg members and further having end walls and also having an opening disposed through said side wall and into said drum member and further having a hole being disposed through one of said end walls;

a lid being hingedly attached to said drum member and being closable over said opening;

a door being hingedly attached to said drum member and being closable over said hole and having a handle member;

a grate assembly including a grate member being removably disposed in said drum member; and tray members being attached to said drum member;

wherein said lid includes a laterally-curved wall, and also includes a handle being attached to said laterally-curved wall;

wherein said tray members includes a first tray member which is hingedly attached to an exterior of said side wall of said drum member below said opening and which extends a length of said drum member, and also includes a second tray member which is hingedly attached to one of said end walls of said drum member and which extends outwardly of said side wall of said drum member.

5. A grill apparatus comprising:

a drum support assembly including a plurality of leg members, and also including cross members interconnecting said leg members;

a drum member having a side wall which is securely mounted upon top ends of said leg members and further having end walls and also having an opening disposed through said side wall and into said drum member and further having a hole being disposed through one of said end walls;

a lid being hingedly attached to said drum member and being closable over said opening;

a door being hingedly attached to said drum member and being closable over said hole and having a handle member;

a grate assembly including a grate member being removably disposed in said drum member; and tray members being attached to said drum member;

wherein said grate assembly further includes bracket members being attached in said drum member to said side wall, and also includes handle members being attached along edges of said grate member, each of said bracket members having a first planar portion which is attached to said drum member and also having a second planar portion which is angled relative to said first planar portion and which supports said grate member thereupon.

6. A grill apparatus as described in claim 1, wherein said tray members includes a first tray member which is hingedly attached to an exterior of said side wall of said drum member below said opening and which extends a length of said drum member, and also includes a second tray member which is hingedly attached to one of said end walls of said drum member and which extends outwardly of said side wall of said drum member.

7. A grill apparatus as described in claim 4, wherein said drum support assembly also includes wheel members being attached at bottom ends of at least two of said leg members, and further includes feet members being attached at bottom ends of the other of said leg members.

8. A grill apparatus as described in claim 4, wherein said drum member is cylindrically-shaped.

9. A grill apparatus as described in claim 5, wherein said drum support assembly also includes wheel members being attached at bottom ends of at least two of said leg members, and further includes feet members being attached at bottom ends of the other of said leg members.

10. A grill apparatus as described in claim 5, wherein said drum member is cylindrically-shaped.

11. A grill apparatus as described in claim 5, wherein said tray members includes a first tray member which is hingedly attached to an exterior of said side wall of said drum member below said opening and which extends a length of said drum member, and also includes a second tray member which is hingedly attached to one of said end walls of said drum member and which extends outwardly of said side wall of said drum member.

12. A grill apparatus as described in claim 1, wherein said lid includes a laterally-curved wall, and also includes a handle being attached to said laterally-curved wall.

13. A grill apparatus as described in claim 1, wherein said grate assembly further includes bracket members being attached in said drum member to said side wall, and also includes handle member being attached having along edges of said grate member, each of said bracket having a first planar portion which is attached to said drum member and also having a second planar portion which is angled relative to said first portion and which supports said grate member thereupon.

* * * * *